(12) United States Patent  (10) Patent No.: US 9,399,518 B2
Cecinas et al.  (45) Date of Patent: Jul. 26, 2016

(54) ENERGY ABSORBER FOR A CRASHWORTHY SEAT AND CRASHWORTHY SEAT COMPRISING SUCH AN ENERGY ABSORBER

(71) Applicant: EADS SOGERMA, Rochefort (FR)

(72) Inventors: Laurent Cecinas, Rochefort (FR); Nicolas Taraud, Rochefort (FR)

(73) Assignee: STELIA AEROSPACE, Rochefort (FR)

( * ) Notice: Subject to any disclaimer, the term of this patent is extended or adjusted under 35 U.S.C. 154(b) by 22 days.

(21) Appl. No.: 14/559,137

(22) Filed: Dec. 3, 2014

(65) Prior Publication Data

US 2015/0151841 A1 Jun. 4, 2015

(30) Foreign Application Priority Data

Dec. 3, 2013 (FR) ...................................... 13 62027

(51) Int. Cl.
*B64D 11/06* (2006.01)
*F16D 55/08* (2006.01)
*B60N 2/427* (2006.01)
*F16F 7/04* (2006.01)
*B60N 2/42* (2006.01)

(52) U.S. Cl.
CPC .......... *B64D 11/0619* (2014.12); *B60N 2/4242* (2013.01); *B60N 2/42736* (2013.01); *F16D 55/08* (2013.01); *F16F 7/04* (2013.01)

(58) Field of Classification Search
CPC ....... B64D 11/0619; F16D 55/08; F16F 7/04; B60N 2/4221; B60N 2/42736
USPC ........................................ 188/82.6, 166, 71.5
See application file for complete search history.

(56) References Cited

U.S. PATENT DOCUMENTS 1,656,744 A * 1/1928 Manzel .................... F16F 9/145
  137/524
3,985,388 A 10/1976 Hogan
4,440,441 A 4/1984 Marrujo et al.
5,692,705 A 12/1997 Bellais
(Continued)

FOREIGN PATENT DOCUMENTS

DE 384 073 C 10/1923
DE 434 164 C 9/1926
(Continued)

OTHER PUBLICATIONS

FR Search Report, dated Nov. 14, 2014, from corresponding FR application.

*Primary Examiner* — Melanie Torres Williams
(74) *Attorney, Agent, or Firm* — Young & Thompson

(57) ABSTRACT

An energy absorber (100) to limit an acceleration force experienced by a heavy body, such as an occupant of a seat subjected to the acceleration of an aircraft crash, comprises a winding drum (10) mounted in rotation around a shaft (13), around which a traction line (11) is wound. The shaft is coupled mechanically to a brake (20) that immobilizes the shaft (13) in rotation when a torque applied to the shaft by the traction line is less than the maximum brake torque that can be generated by the brake and that when the shaft (13) is in rotation generates a torque that is approximately constant and equal to the maximum brake torque.

A control element (40) acting on the brake (20) makes it possible to modify the value of the maximum brake torque and thus to adapt the energy absorber to the mass of the heavy body to maintain an acceleration experienced at a desired value for different masses.

12 Claims, 4 Drawing Sheets

(56) References Cited

U.S. PATENT DOCUMENTS

| | | | |
|---|---|---|---|
| 7,428,952 B2 * | 9/2008 | Miyamoto | F16F 7/04 16/51 |
| 7,921,973 B2 | 4/2011 | Wereley et al. | |
| 2011/0204685 A1 | 8/2011 | Dock | |

FOREIGN PATENT DOCUMENTS

| | | |
|---|---|---|
| EP | 0 075 067 A1 | 3/1983 |
| EP | 0 716 980 A1 | 6/1996 |
| EP | 2 360 095 A1 | 8/2011 |

* cited by examiner

ENERGY ABSORBER FOR A CRASHWORTHY SEAT AND CRASHWORTHY SEAT COMPRISING SUCH AN ENERGY ABSORBER

BACKGROUND OF THE INVENTION

1. Field of the Invention

This invention belongs to the field of seats for a transport vehicle. It relates more particularly to a device for absorbing the energy of a seat in the event of high acceleration and a seat comprising such a device intended to be installed in a vehicle that can experience high accelerations.

The invention is applicable in particular aboard aircraft, to absorb energy in the event of acceleration connected with a crash.

2. Description of the Related Art

In the field of the transport of persons, in particular in air transport, the accelerations caused by a crash can reach levels that are barely tolerable for a person. It is known to limit the value of the maximum acceleration experienced by a person aboard an aircraft by absorbing a portion of the energy applied to the seat on which this person is located.

According to a known method, for example from the document U.S. Pat. No. 4,440,441, the deformation of the structures of the seat is used to absorb energy in the event of a crash.

In this case, it is necessary to design the structure of the seat so that it is deformed in a suitable manner and so that the structure remains sufficiently strong to hold the passenger. The design regulations are in this case very restrictive.

According to another known method, for example from the document U.S. Pat. No. 3,985,388, the seat pan of the seat is attached, with a possibility of shifting in an assumed direction of the acceleration in the event of a crash, to a rigid structure using energy-absorbing elements during a shifting of the seat pan by plastic deformations of elements for connecting the seat pan to the rigid structure or dampers that function after the breaking of a shear pin element.

These various known solutions to limit the accelerations experienced in the event of a crash exhibit the drawback of leading to irreversible deformations, and, as a consequence, the means that absorb the energy cannot be tested individually and then placed back in operation.

Furthermore, the energy to be absorbed in the event of acceleration is a function of the mass of the seat with its occupant. Taking into account that all possible occupants of a seat do not necessarily have the same weight, the energy absorption devices are most often a compromise between the weight of the lightest passenger envisaged and that of the heaviest, which poses problems both for the maximum value of the acceleration experienced, higher for the lightweight occupant, and for the amplitude of the movement during which the acceleration is experienced, greater for a heavy occupant. Such a solution is therefore appropriate only partially and imperfectly in the extreme cases.

Solutions for matching the energy absorber to the weight of the occupant of the seat, such as, for example, the solution described in the document U.S. Pat. No. 7,921,973, are generally complex and therefore more costly and less reliable.

BRIEF SUMMARY OF THE INVENTION

This invention has as its object to eliminate these drawbacks with an energy absorber that makes it possible, during a period of operation at a determined shifting amplitude, to limit the acceleration to which a heavy mass, such as the passenger of a seat, is subjected during a high acceleration.

To limit an acceleration force experienced by a heavy body, the energy absorber comprises a winding drum mounted in rotation around a shaft, around which a traction line is wound, in an untriggered configuration of the energy absorber. The shaft is mechanically coupled to a rotor of a disk brake, a stator of which is immobilized in rotation relative to a casing and a spring element is compression-mounted between two sub-assemblies of the brake, each sub-assembly comprising rotor and stator elements that are mounted alternately and mobile in a direction of an axis of rotation of the rotor, in such a way as to exert a support force that is applied between the rotor elements and the stator elements in contact, so as to immobilize the shaft in rotation when a torque applied to the shaft by the traction line that is subjected to a tractive force is less than a maximum braking torque of the brake and that when the shaft is in rotation, in a triggered configuration of the energy absorber, generates a torque that is approximately constant and equal to the maximum braking torque.

A traction line is thus obtained that is locked when the traction exerted on the traction line is less than that producing, on the shaft, the maximum torque of the brake and that is subjected to a constant tractive force when the traction line unwinds from the winding drum.

The energy absorber advantageously comprises a control element acting on the brake to modify the value of the maximum brake torque. It is thus possible to modify the tractive force applied by the traction line when the traction line unwinds and to adapt this tractive force to a heavy mass attached to the free end of the traction line to obtain an acceleration experienced by the heavy mass that is approximately independent from the value of the mass under consideration.

Depending on the technically possible configurations, the energy absorber comprises all or part of the following characteristics.

In an embodiment, the brake of the energy absorber comprises a rotor coupled in rotation to the shaft of the winding drum and comprises a stator locked in rotation in a casing, a friction force between the rotor and the stator determining the value of the maximum brake torque.

For example, the rotor is mounted on the shaft. A direct coupling is thus obtained without play and without a complex or fragile element between the winding drum and the rotor of the brake.

In an embodiment, rotor elements and stator elements are mounted alternately, mobile in a direction of an axis of rotation of the rotor, to form a disk brake and are kept in contact with a determined support force to obtain the desired maximum brake torque. According to this arrangement with multiple stator and rotor elements, it is possible to obtain the maximum brake torques desired in a relatively small space and with an equally small diameter of the rotor.

In an embodiment, a spring element is compression-mounted in such a way as to exert the support force that is necessary to ensure the desired friction between the stator and rotor elements.

In an embodiment, the spring element is compression-mounted between two sub-assemblies of the brake resting on stator elements. The force exerted by the spring element is thus distributed between two sub-assemblies while ensuring a better distribution of the force on the different elements.

For example, the control element acts to modify a distance between ends of the brake, defined by external faces of the first and of the last stator and/or rotor elements, and consequently a compression length of the spring element. The spring element is thus compressed by a given length that precisely defines the force exerted by the spring element to apply the stator and rotor elements against one another.

For example, the control element has a grip, accessible on the outside of the casing, which drives in rotation a bolt, a threading of which works with a threaded bore of said casing to shift a support element resting on a first stator element and to modify the distance of an external face of said first stator element to an external face of a last rotor element resting on a shoulder of the shaft. The grip makes it possible to act with the desired precision on the compression of the spring element without introducing into it any torsion force that would be able to change the characteristics of it.

The traction line comprises, for example, one or more cables, or one or more belts wound on the winding drum: for example, steel cables or belts of polymer fibers that can be made with the necessary strength and desired flexibility to be completely wound on the winding drum.

The winding drum can be a circular cylinder. This solution proves advantageous when the traction line has a belt or when the traction line has one or more cables to obtain in triggered mode an approximately constant force during the rotation of the winding drum.

The winding drum can also exhibit a circular shape with a non-constant radius, for example a truncated cone, a rule of variation of the radius being defined to respond to a desired rule of variation of the force on the traction line corresponding to a maximum brake torque as a function of a number of turns of said traction line around said winding drum.

In an embodiment, the shaft is further immobilized relative to the casing of the energy absorber, directly or by means of another structure that is fixed in relation to the casing, by means of a sized shear pin the size of which is selected to trigger the shear pin when a force at most equal to a minimum force for triggering said energy absorber is applied to the traction line.

Thus, without disrupting the operation of the brake limiting the torque on the traction line, there is prevented a sliding of the brake that could, in certain circumstances such as in the presence of significant vibrations, occur in a more or less perceptible manner for values of force exerted on the traction line that are less than the value defined for the triggering of the energy absorber.

The invention also relates to a crashworthy seat comprising a carrying structure on which a bucket seat is attached. The bucket seat, or at least a seat pan of the bucket seat, accommodating the weight of an occupant of the seat, is kept immobile on the carrying structure in at least one direction by an energy absorber according to the invention. For this purpose, a casing of the energy absorber is fastened to the carrying structure, and the bucket seat is attached to a free end of the traction line, or conversely, the casing being attached to the bucket seat and the free end of the traction line being attached to the carrying structure.

Thus, when the seat is subjected to a high acceleration, for example in the event of a crash of an aircraft, the force generated by the mass of the occupant, and of the parts of the seat held by the traction line, on the traction line causes the triggering of the energy absorber that limits the acceleration experienced by the occupant of the seat to a determined value, the value at which the acceleration is limited being able itself to be a function of the position of the control element that will have been previously positioned to take into account the mass of the occupant of the seat so that the acceleration experienced is approximately the same regardless of the mass of the occupant of the seat.

In an embodiment, the bucket seat is attached to the carrying structure by guiding elements for a movement of said bucket seat in an approximately vertical direction, in a position of use of the seat, the energy absorber being attached to the carrying structure and to the bucket seat to brake a movement in the approximately vertical direction in the event of vertical acceleration that leads, because of the mass of the bucket seat and of an occupant of the seat, to a force applied on the traction line that generates on the shaft a torque that exceeds the maximum brake torque.

Such a seat proves particularly suited to the protection of a passenger of an aircraft that can be subjected to a crash with a strong vertical component of acceleration, for example in the case of a crash of a rotary wing aircraft.

BRIEF DESCRIPTION OF THE DRAWINGS

The description and the drawings of a particular embodiment of the invention will make it possible to better understand the objects and advantages of the invention. It is clear that this description is given by way of example and does not have a limiting nature.

In the drawings.

DETAILED DESCRIPTION OF THE PREFERRED EMBODIMENTS

Figures 1A, 1B:
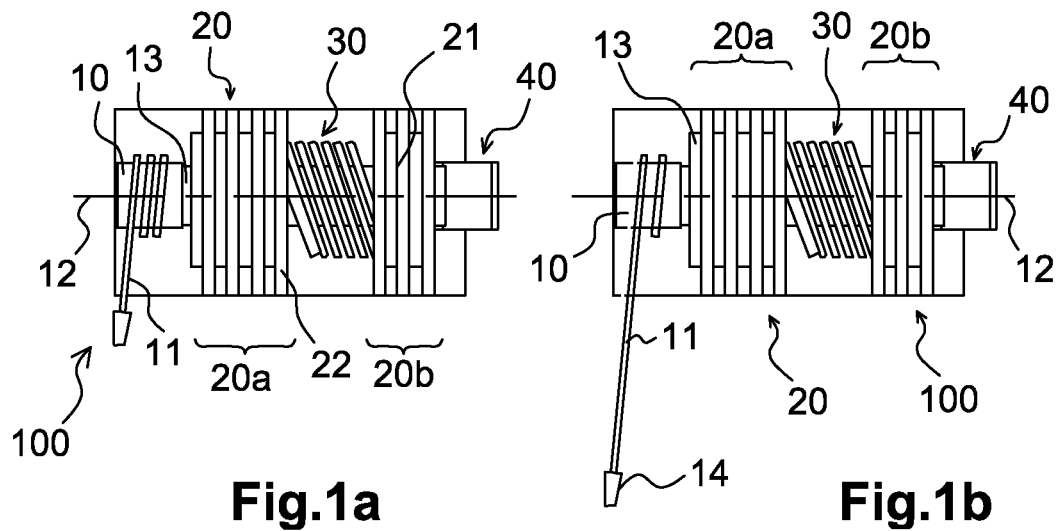
FIGS. 1a and 1b diagrammatically illustrate a basic view of an energy absorber according to the invention, the absorber being illustrated in an untriggered condition in FIG. 1a and in a triggered condition in FIG. 1b.

FIGS. 1a and 1b show a block diagram of an energy absorber 100 according to the invention, said absorber being in FIG. 1a in a configuration before triggering and in FIG. 1b in the configuration after triggering.

"Before triggering" in this description means that the energy absorber has not been subjected to conditions that have led said energy absorber to absorb energy, and in contrast "after triggering" means that said energy absorber has been subjected to conditions in which it has absorbed energy.

The energy absorber 100 comprises mainly:
a traction line 11 made of a flexible and strong material;
a winding drum 10;
a brake 20;
a spring element 30;
a control element 40 for the force exerted by the spring element 30.

The energy absorber also comprises a shaft 13 mounted in rotation around an axis 12 on which the winding drum 10 and a rotor 21 of the brake are attached in such a way that said winding drum and said rotor are integral in rotation around the axis 12.

The rotor 21 of the brake is frictionally coupled with a stator 22 that is immobilized in rotation, a force generated by the spring element 30 ensuring the frictional coupling of said rotor and said stator that form the brake 20.

The control element 40 acts on the spring element 30 to modify the force that ensures the frictional coupling of the rotor and of the stator of the brake.

The traction line 11 is attached at a first end to the winding drum 10 on which said traction line is wound when the device 100 is not triggered as illustrated in the FIG. 1a diagram.

According to this configuration of the device 100, a tractive force exerted on the traction line 11, for example at a second free end 14 of said traction line, generates a drive torque on the shaft 13, a function of the tractive force and of the application distance of said force to the axis 12 therefore a function of the diameter of the winding drum 10.

As long as the drive torque on the shaft 13 is less than a maximum brake torque created by the brake 20, the shaft 13 remains locked in rotation and the traction line 11 is also locked.

When the tractive force on the traction line 11 is increased to a value leading to a drive torque that exceeds the maximum brake torque, the shaft 13 is driven in rotation whereas the maximum brake torque is maintained by the brake 20 and the traction line 11 is unwound from the drum 13 as illustrated in the diagram of FIG. 1b.

The result is that the force to which the traction line 11 is subjected is limited to the value corresponding to the maximum brake torque as long as said traction line is not totally unwound from the winding drum 10.

When the traction line 11 is totally unwound from the winding drum 10, the rotation of the shaft 13 is stopped, the traction line being attached to said winding drum at the first end.

It results from the limiting of the force on the traction line 11 that when this force is the result of a Gamma acceleration on a given mass m, said Gamma acceleration is also limited according to the common equation "F=m Gamma."

When the mass is known, for example that of a mobile part of a seat and of its occupant that must not undergo an acceleration greater than a value Gamma_max, the force Fmax that must be applied to the traction line and therefore the maximum brake torque applied by the brake 20 to the winding drum 10 is deduced from it.

An action on the control element 40 acts on the force developed by the spring element 30 and on the frictional coupling of the rotor and the stator of the brake 20 and then makes it possible to adjust the maximum brake torque to the value corresponding to the mass under consideration and to the desired acceleration Gamma_max that must trigger the sliding between the stator and the rotor.

Advantageously, the control element 40 comprises a control that is graduated, for example by mass.

Figures 2A, 2B:
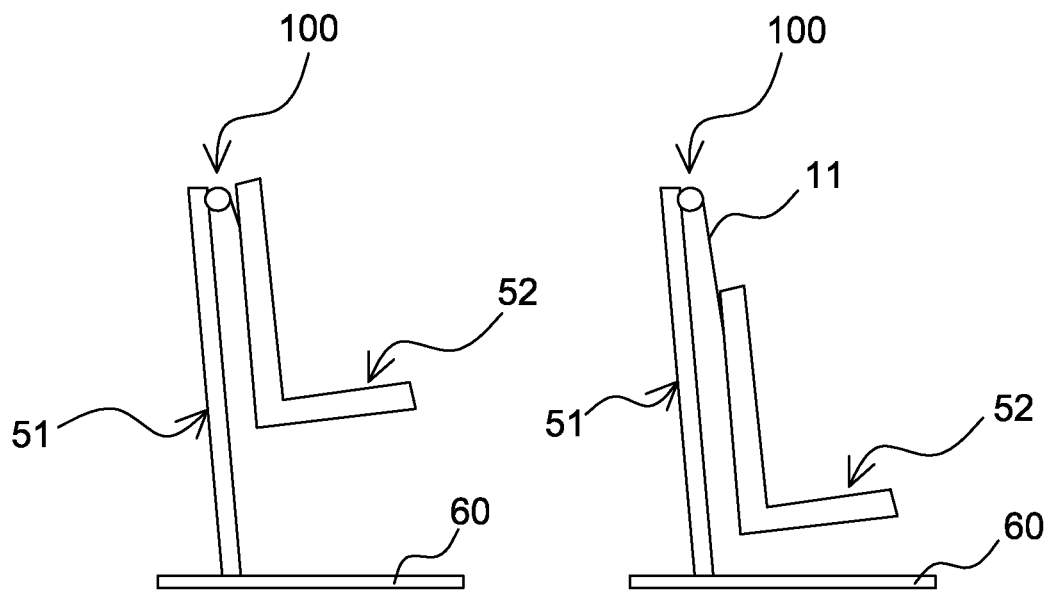
FIGS. 2a and 2b diagrammatically illustrate a basic profile view of a seat comprising the energy absorber of FIGS. 1a and 1b, respectively in untriggered position, FIG. 2a, and in triggered position, FIG. 2b, of the energy absorber.

FIGS. 2a and 2b show in profile a seat 50, illustrated very diagrammatically, comprising an energy absorber 100.

The seat 50 comprises a carrying structure 51 and a bucket seat 52 attached to the carrying structure.

The bucket seat 52 is illustrated in a very simplified manner and represents the part of the seat that, with the occupant of the seat, is subjected to the acceleration, here an approximately vertical acceleration, which must be limited. Depending on the type of seat, the bucket seat can be, for example, a rigid bucket seat in which a seat pan and a back rest are attached rigidly or comprise a back rest and a seat pan hinged to one another.

The bucket seat 52 is mounted on slide mechanisms or another guiding device, for example hinged, not shown, of the carrying structure 51, in such a way as to be guided in a shifting in a direction in which the acceleration is limited.

In FIG. 2a, the movement of the bucket seat 52 in the direction determined by the guiding device is locked by an energy absorber 100 attached to the carrying structure 51 and whose free end 14 of the traction line is attached to said bucket seat.

It is understood that in the example illustrated, the acceleration that must be limited is an approximately vertical acceleration (or an approximately vertical component of the acceleration to which the seat is subjected) and oriented from the bottom to the top in reaction to a crash having a strong vertical component.

In this configuration of FIG. 2a, the brake opposes the unwinding of the traction line as long as no force capable of generating a drive torque greater than the maximum brake torque is reached, i.e., the acceleration to which the mass of the bucket seat and the occupant of the seat together are subjected has not led to generating the necessary force, here taken for its component along the traction line 11.

When the acceleration, for example in the event of a crash, produces on the traction line 11 a force generating a drive torque greater than the maximum brake torque of the energy absorber 100, a sliding occurs between the stator 22 and the rotor 21 of the brake that limits the drive torque to the value of the maximum brake torque, which has the consequence of limiting, throughout the entire duration of the sliding, the force on the traction line 11 and therefore the acceleration experienced by the occupant of the seat.

The sliding between the stator 22 and the rotor 21 ceases as soon as the drive torque becomes less than the maximum brake torque, or the traction line 11 is totally unwound from the winding drum 10.

In practice, the length of traction line 11 unwound on winding drum 10 determines the distance over which the acceleration undergone is limited and, if the maximum brake torque is adjusted to a value that is a function of the mass held by the traction line to obtain a fixed given acceleration, determines a duration that is approximately independent of the mass during which the acceleration will be limited to the selected value.

This duration that is determined by the characteristics of the energy absorber 100 and that can be approximately constant regardless of the mass, under acceptable operational limits, of an occupant of the seat corresponds advantageously at least to the duration of the acceleration peak as foreseen in the event of a crash under normal safety standards, for example under the aeronautical safety standards of the JAA and FAA, for its part exceeding, for example, an acceleration of 60 m/s2 (acceleration factor of about 6 g). In the case of the crash conditions of an aircraft, a length of shifting of the bucket seat of between 100 mm and 200 mm is generally sufficient to limit the acceleration peak.

Other arrangements of the energy absorber 100 on the seat 50 are possible and that make it possible to obtain a similar result.

For example, the energy absorber 100 can be attached to the bucket seat 52 and the free end 14 of the traction line attached to the carrying structure 51.

Configurations with a return for the traction line, for example by pulleys, are also possible provided that the traction line between the bucket seat 52 and the carrying structure 51 has an orientation close to the direction of the acceleration that must be limited. In practice, solutions will, however, be avoided that would introduce play or an excessive lengthening of the traction line, because of dangers of elastic lengthening of said traction line, and solutions that would lead to an excessive heaviness of the part of the seat that must be subjected to the traction of the traction line and that must be braked.

Figure 3:
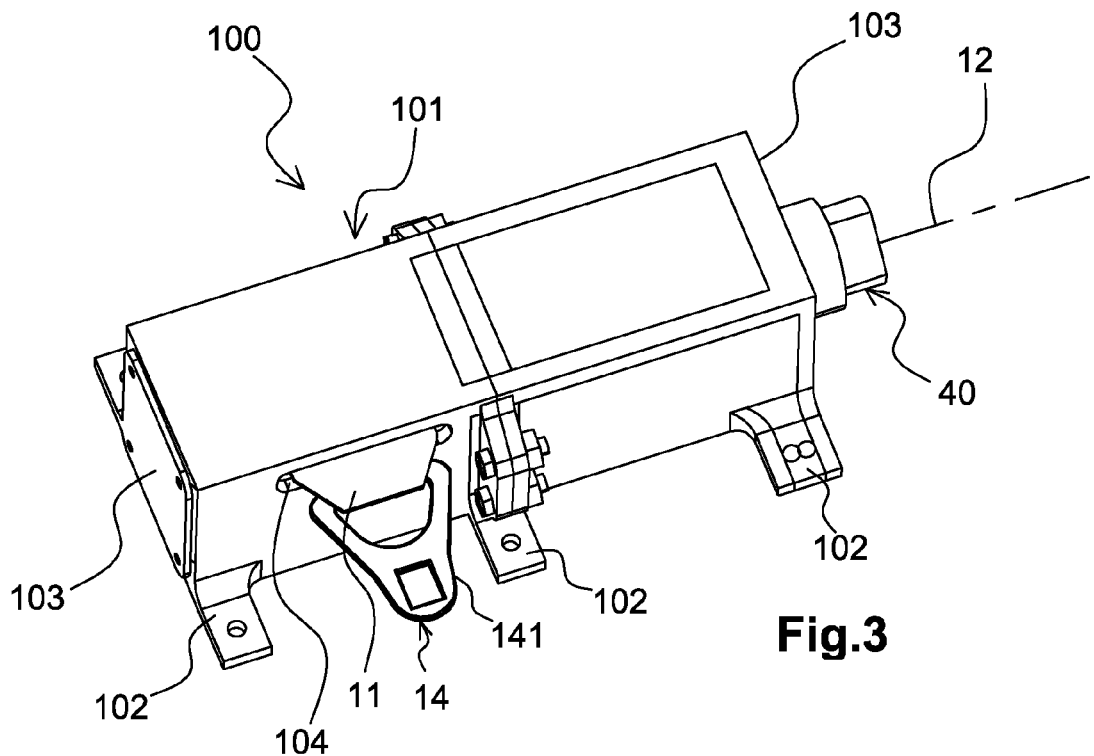
FIG. 3 shows in perspective view an example of embodiment of a belt energy absorber incorporated into a casing according to the invention.
Figure 4:
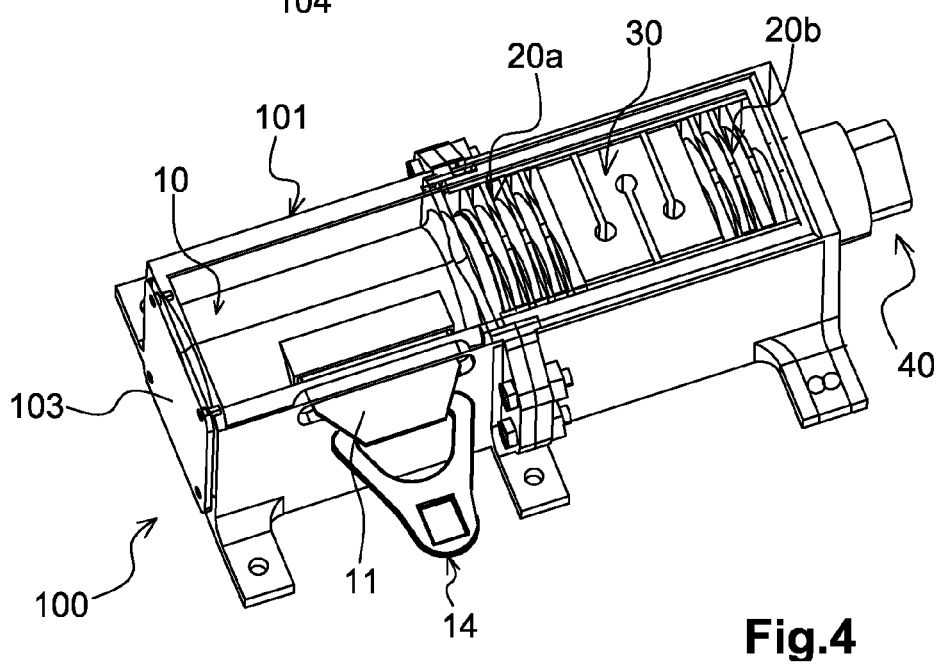
FIG. 4 represents in perspective view the energy absorber of FIG. 3 of which one face of the casing is not represented to show the arrangement of the components of the energy absorber.
Figure 5:
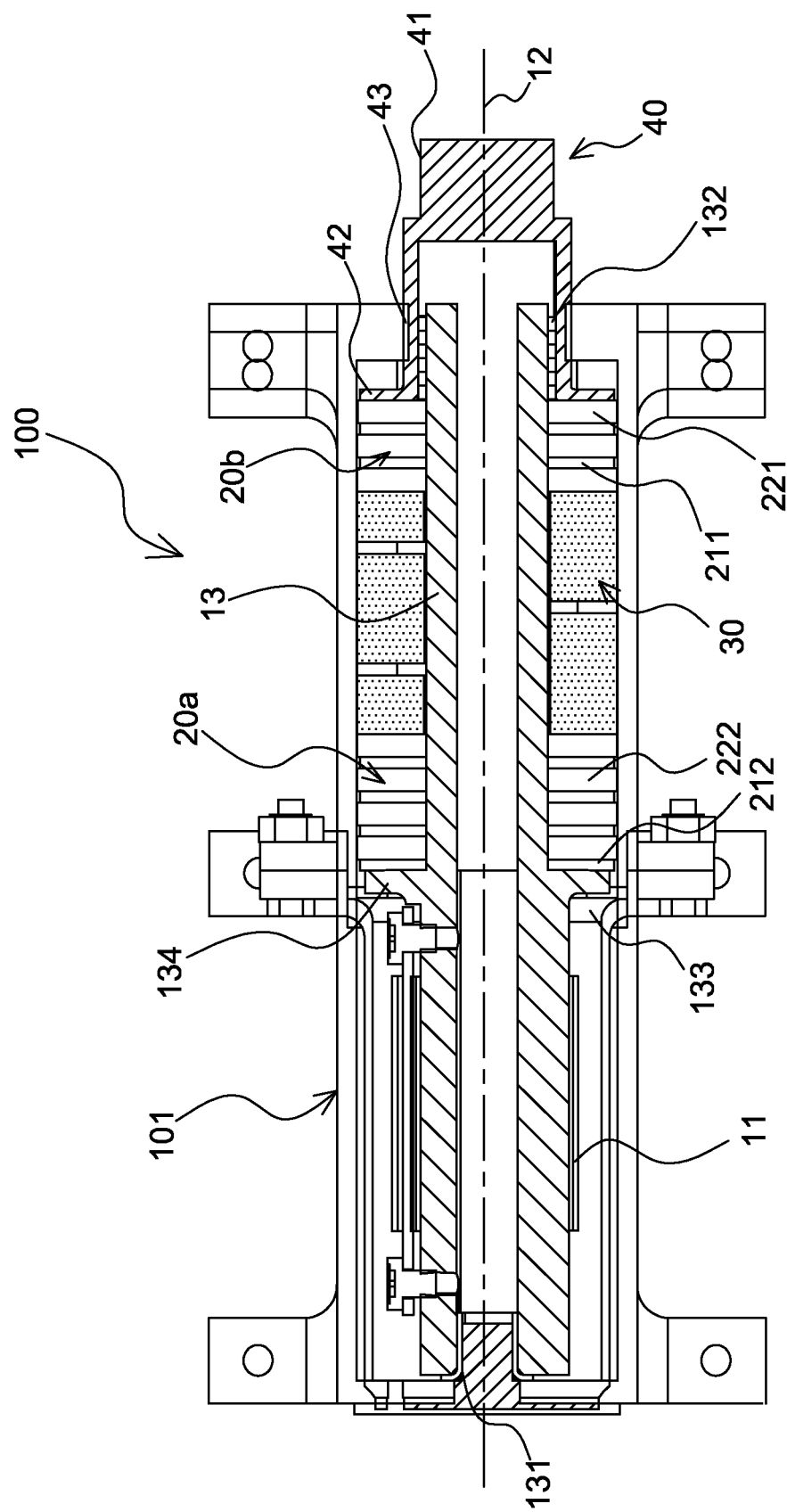
FIG. 5 represents a section along an axial plane of the energy absorber of FIGS. 3 and 4 showing the arrangement of the components of the energy absorber.

FIGS. 3, 4 and 5 show an example of embodiment of an energy absorber 100 according to the invention.

In FIG. 3, the energy absorber 100 is illustrated in a configuration ready to operate, i.e., before triggering.

The energy absorber appears in the general shape of a rectangular parallepiped casing 101, with two approximately square end faces 103, and that is elongated along the dimension perpendicular to the end faces.

The axis 12 is parallel to the edges of the elongated faces and goes approximately through the centers of the end faces 103.

The casing 101 also comprises attachment lugs 102, in number and in arrangement on said casing necessary to attach said casing on a carrying structure or on the bucket seat of a seat.

At least one control element 40 is accessible from the outside of the casing 101. In the example illustrated, the control element is terminated by a grip 41, which can be driven in rotation by hand or using a tool such as a key, located on one of the end faces 103.

The traction line 11 is made with a belt whose free end 14 has a fastening buckle 141, for example a metal loop.

The traction line 11 comes out of the casing 101 through an opening 104 with a relatively narrow and elongated shape to allow free passage for the belt of the traction line 11 and to avoid/limit the danger of penetration of foreign bodies.

FIG. 4 represents the energy absorber 100 of FIG. 3, one face of which is not represented, and FIG. 5 represents the energy absorber in axial cutaway in such a way as to show the interior components of said energy absorber and the manner in which they cooperate.

On the side of a first end of the casing 101, to the left in FIGS. 3, 4 and 5, there is found the winding drum 10 on which the belt of the traction line 11 is wound.

On the side of a second end of the casing 101, to the right in FIGS. 3, 4 and 5, there is found the brake 20 and the spring element 30. In this example of embodiment, the stator 22 and the rotor 21 of the brake 20 comprise two sub-assemblies 20a and 20b between which sub-assemblies the spring element 30 is found.

The brake stator 22 comprises an assembly of friction elements 222 locked in rotation by the casing 101, and independent of the shaft 13 of axis 12. The friction elements 222 of the stator are free in translation, over a distance that is sufficient to guarantee the operation of the brake, in such a way as to be able to be shifted in the direction of the axis 12 relative to the casing and relative to the shaft 13.

The locking in rotation in the casing of the friction elements 222 is, for example, obtained by a shape of said friction elements that is adjusted to the inside shape of the casing, for example square, which holds the stator elements immobile in rotation around the axis 12 all while allowing a longitudinal sliding in a square-section tube formed by the casing.

The brake rotor 21 comprises an assembly of friction elements 211 mounted driven in rotation with the shaft 13. The friction elements 211 of the stator are free in translation on the shaft 13 in such a way as to be able to be shifted in the direction of the axis 12 relative to the casing and relative to the shaft 13. Such a result is, for example, obtained with a grooved shaft and a form of a central hole of the friction elements of the rotor comprising teeth that are complementary of the grooves of the shaft.

The friction elements 221 of the rotor are, for example, disks, an outside diameter of which is selected to ensure that said disks are able to turn without interference with the inside walls of the casing.

The friction elements 211 of the stator and the friction elements 222 of the stator are mounted alternately on the shaft 13 and thus form a disk brake, the number of disks making it possible to obtain capabilities of the brake to create a desired maximum brake torque without increasing excessively the size of the disks and/or the force needed to create the necessary friction between the stator and the rotor.

In a known way, the contact surfaces between the rotor and stator elements are relatively smooth, or at least suited to permit a sliding between the contact elements.

The materials that make it possible to obtain a sliding with friction are known, and in the case of the energy absorber 100, materials will be preferred whose static friction force, without rotation of the rotor, is equal to or close to the dynamic friction force when the rotor is in rotation.

It must also be noted that the brake 20 is intended to remain static over a long period and to operate over a limited number of revolutions and a limited number of times, mostly during tests for good operation.

The materials of the elements of the stator and the rotor will therefore be selected to avoid risks of sticking whereas their capabilities to withstand wear by use are not critical in the case of the energy absorber 100.

The spring element 30 is placed between the two sub-assemblies 20a, 2b of the brake 20 so as to be compressed between said two brake sub-assemblies to obtain an application force of contact faces of the stator and rotor elements.

In the example illustrated, the spring element 30 consists of a block of a rigid material with elastic properties, which is machined to make possible an elastic deformation in the direction of the axis 12.

The shape of the spring element ensures its immobilization in rotation in the casing 101 without prohibiting its movement in the direction of the axis. This choice that is not obligatory makes it possible, however, to limit the revolving mass in the energy absorber and therefore the transient effects on the speed of rotation during a triggering of the energy absorber.

In this case, it is preferred that the spring element 30 rest, as illustrated, on stator elements to avoid a friction on said spring element whose material is not selected for its friction properties. However, it is possible to deposit a friction material on faces of the spring element if said spring element is in contact with a rotor element or elements.

It must also be taken into consideration that the spring element 30 remains constantly compressed, waiting for a possible triggering of the energy absorber 100, and that it must therefore maintain its elasticity under these conditions so as to maintain, under a given and maintained crushing, a force of pressure between the stator and rotor elements that is approximately constant throughout the operational lifespan of the energy absorber.

The spring element can be made of a steel or of a polymer material that is or is not fiber-filled.

The control element 40 comprises a support element 42 whose position in the direction of the axis 12 is adjustable. The position of the support element 42 is, for example, adjusted by a threading 43 of a bolt of the control element 40 that works with a threaded hole of the casing 101, the bolt being provided at one end, which is external to said casing, with a grip 41, for example a knurled button, and/or with a shape suitable to be driven in rotation to be screwed or unscrewed by a tool.

If necessary, the control element comprises means for locking in rotation, not shown, to prevent a tightening or loosening that is not controlled by the bolt, for example under the effect of vibrations.

The support element 42 is located on the side of an external face of a first stator element 221 against which it exerts the support force to obtain a desired compression of the spring element. Being thus in support against a non-revolving element of the brake 20, introducing forces that can cause a tightening or loosening of the control element 40 during a triggering of the energy absorber is avoided.

The shaft 13 also comprises a shoulder 134 located on the side of an external face of a final rotor element 212 located at one end opposite the brake 20 relative to the first stator element 221. It must be noted that the final rotor element 212 is driven in rotation with the shaft 13 and that it is therefore advantageously immobile in rotation relative to the shoulder 134.

According to this arrangement, the assembly of the stator and rotor elements as well as the spring element 30 are placed on the shaft 13 between the shoulder 134 and the support element 42.

When the support element 43 is sufficiently close to the shoulder 134, the facing surfaces of the rotor and stator elements are in contact and subjected to a pressure established by the force with which the spring element 30 is compressed.

A maximum brake torque results that prevents the rotation of the rotor 21 and therefore of the shaft 13 so long as no drive torque greater than the maximum brake torque is applied to said shaft by a pull on the belt of the traction line, a maximum brake torque that can be modified by an action on the grip 41, screwing to increase the maximum brake torque or unscrewing to reduce the maximum brake torque.

Such an adjustment is made accessible by the grip 41 when the energy absorber 100 is attached to a structure of a seat 50 in such a way that the maximum brake torque can be changed as a function of the mass of the occupant of the seat.

The grip 41 comprises, for example, a position indicator graduated by mass so as to obtain a triggering of the energy absorber 100 for an approximately constant acceleration with the various masses of the possible occupants of the seat.

To ensure an optimal functioning of the energy absorber, the shaft 13 is kept centered on the axis 12 by end bearings 131, 132 or intermediate bearings 133 in such a way as to limit to the utmost the unwanted friction and the offsets that would disrupt the brake torque controlled by the brake 20.

The detailed embodiment described is only one non-limiting example of one embodiment.

For example, the traction line can be one or more belts, as in the detailed example, one or more cables or a chain, the winding drum then being suited to the type of traction line used.

Figure 6:
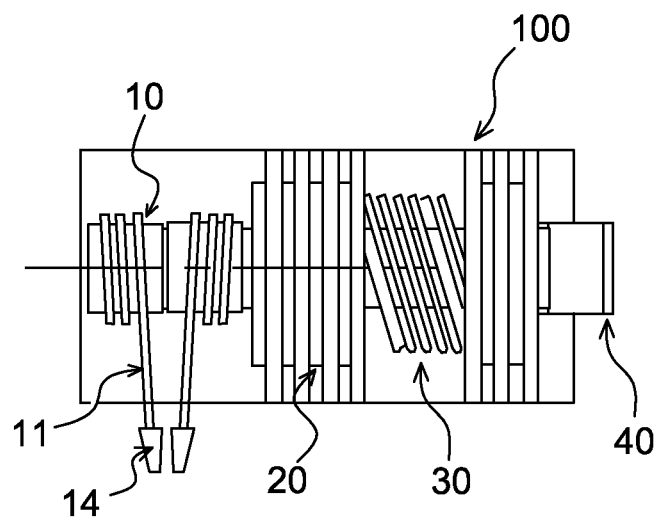
FIG. 6 diagrammatically illustrates a basic view of an energy absorber according to the invention comprising a winding drum with two cables used as a traction line.

According to the basic diagram of FIG. 6, the traction line 11 can consist of a plurality of cables wound on the winding drum 10. Such a configuration does not change the value of the brake torque but ensures a redundancy in the structure of the energy absorber in the event of, particularly, breaking a cable.

Figure 7:
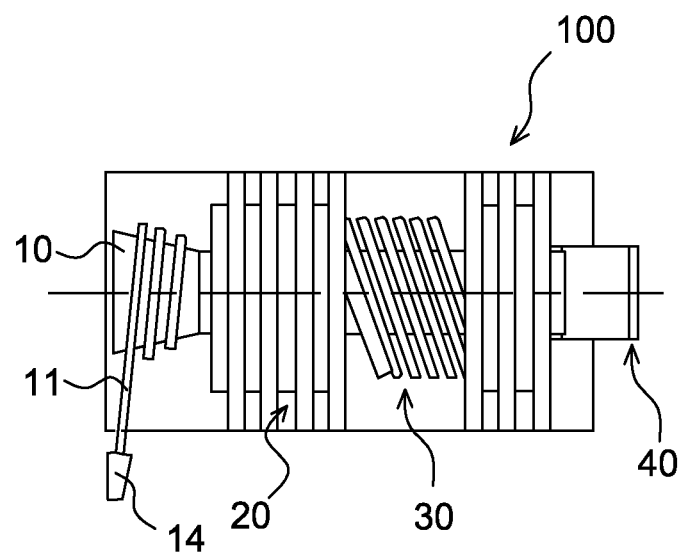
FIG. 7 diagrammatically illustrates a basic view of an energy absorber according to the invention comprising a non-cylindrical winding drum.

According to another variant presented in the basic diagram of FIG. 7, the winding drum 10 is not a cylindrical drum but presents a profile from which it appears that the diameter of said winding drum varies according to the position under consideration on the axis 12.

When the energy absorber is triggered, the tractive force corresponding to the maximum brake torque is then different depending on the position of the cable on the winding drum, weaker when the local diameter of the drum is greater and stronger when the local diameter of the drum is smaller.

It is thus possible to obtain in triggered mode of the energy absorber a variable profile of the acceleration experienced by the occupant of the seat.

Such a variable profile makes it possible, for example, to reduce the force on the traction line needed to initiate the rotation of the brake, the maximum brake torque being able to be at the beginning of the greater movement by the very fact of the design of the brake or by the fact of a sticking linked to an extended period of time passed without rotation, and then to resume a desired limiting acceleration.

A conical shape of the winding drum as represented in FIG. 7 makes it possible to gradually increase the acceleration experienced by the occupant of the seat and to limit the perceived effects of a sudden stop of the bucket seat in the case where the period of the acceleration linked to the crash would lead to a total unwinding of the cable.

It must be noted that a similar effect is obtained when the traction line is made with a belt of considerable thickness, the apparent radius of the drum being a function of the number of turns still wound on said drum and decreasing gradually when the belt is unwound.

Other brake shapes, not illustrated, are also possible, such as, for example, drum-shaped rotors on a cylindrical envelope surface on which pads are applied with more or less force and/or greater or fewer in number to obtain the desired brake torque.

In an embodiment, not illustrated, the shaft driven in rotation by the drum is immobilized relative to a casing of the energy absorber by means of a sized shear pin, for example a shear-mounted pin.

The size of said pin is selected in such a way that it is sheared when the torque corresponding to the force on the traction line that must trigger the operation of the energy absorber is applied to the drum.

Thus, a possible sliding of the brake is avoided, for example because of an intense vibrating environment, without the triggering force, or at least the triggering of the shear pin, being reached or exceeded.

When the limited force and the corresponding brake torque are a function of the adjustment applied to the energy absorber, a size of the shear pin will be selected that takes into account the smallest force that must trigger the operation of the energy absorber.

In this embodiment, the precaution will also preferably be taken to withdraw the shear pin to perform the tests of the brake only to replace said shear pin after the test.

It must also be understood that the winding drum is coupled mechanically to the brake so as to be subjected to the brake torque, but that the brake is not necessarily mounted on the same axis of rotation as the winding drum, mechanical transmissions exhibiting, for example, transfer gears or other coupling devices being possible.

In an embodiment, the adjusting of the brake as a function of weight is ensured automatically, for example by a system for measuring the weight of the occupant of the seat in the static condition and a device such as an electric actuator acting on the control element as a function of said measured weight.

Thus, an energy absorber for a seat and a seat that can be subjected to crash accelerations are obtained that make it possible to limit the acceleration to which an occupant of the seat is subjected by taking into account the mass of said occupant.

Further, the operation of the system is not destructive, which makes it possible to test the correct operation of the energy absorber, for example before its being put into service or periodically, and to put it back in operating condition again.

The invention claimed is:

1. An energy absorber (100) to limit an acceleration force experienced by a heavy body, comprising a winding drum (10) mounted in rotation around a shaft (13), around which a traction line (11) is wound, in an untriggered configuration of the energy absorber, in which said shaft is mechanically coupled to a rotor (21) of a disk brake (20), a stator (22) of which is immobilized in rotation relative to a casing (101), characterized in that a spring element (30) is compression-mounted between two sub-assemblies (20a, 20b) of the brake (20), each sub-assembly comprising rotor and stator elements that are mounted alternately and mobile in a direction of an axis of rotation of the rotor (21), in such a way as to exert a support force that is applied between the rotor elements and the stator elements in contact, so as to immobilize the shaft (13) in rotation when a torque applied to the shaft by the traction line (11) that is subjected to a tractive force is less than a maximum brake torque of the brake and that when the shaft is in rotation, in a triggered configuration of the energy absorber, generates a torque that is approximately constant and equal to the maximum brake torque.

2. The energy absorber according to claim 1, further comprising a control element (40) acting on the brake (20) to modify a maximum brake torque value.

3. The energy absorber according to claim 1, wherein the rotor (21) is mounted on the shaft (13).

4. The energy absorber according to claim 1, wherein the spring element (30) is compression-mounted between the two sub-assemblies (20a, 20b) of the brake (20) resting on stator elements (222).

5. The energy absorber according to claim 1, wherein a control element (40), acting on the brake (20) to modify a value of the maximum brake torque, acts to modify a distance between ends of the brake (20), defined by external faces of the first and last stator and/or rotor element, and consequently a compression length of the spring element (30).

6. The energy absorber according to claim 5, wherein the control element (40) comprises a grip (41), accessible on the outside of the casing (101), driving in rotation a bolt, a threading (43) of which works with a threaded bore of said casing to shift a support element (42) resting on a first stator element (221) and to modify the distance from an external face of said first stator element to an external face of a last rotor element (212) resting on a shoulder (134) of the shaft (13).

7. The energy absorber according to claim 1, wherein the traction line comprises one or more cables or one or more belts wound on the winding drum (10).

8. The energy absorber according to claim 1, wherein the winding drum (10) is a circular cylinder.

9. The energy absorber according to claim 1, wherein the winding drum (10) has a circular shape with a non-constant radius, for example a truncated cone, a rule of variation of the radius being defined to respond to a desired rule of variation of the force on the traction line (11) corresponding to a maximum brake torque as a function of a number of turns of said traction line around said winding drum.

10. The energy absorber according to claim 1, wherein the shaft (13) is further immobilized relative to the casing of said energy absorber by means of a sized shear pin whose size is selected to trigger said shear pin when a force at most equal to a minimum force for triggering said energy absorber is applied to the traction line (11).

11. A crashworthy seat (50) comprising a carrying structure (51) on which a bucket seat (52) is attached, wherein said bucket seat, or at least a seat pan of said bucket seat, is held immobile on said carrying structure in at least one direction by an energy absorber (100) in accordance with claim 1, a casing (101) of said energy absorber being attached to the carrying structure (51) and the bucket seat (52) being attached to a free end (14) of the traction line (11), or conversely the casing (101) being attached to the bucket seat (52) and the free end (14) of the traction line (11) being attached to the carrying structure (51).

12. The crashworthy seat according to claim 11, wherein the bucket seat (52) is attached to the carrying structure (51) by guiding elements for a movement of said bucket seat in an approximately vertical direction, in a position of use of the seat, the energy absorber (100) being attached to said carrying structure and to said bucket seat to brake a movement in the approximately vertical direction in the event of vertical acceleration that leads, because of the mass of the bucket seat (52) and of an occupant of the seat, to a force applied on the traction line (11) that generates on the shaft (13) a torque that exceeds the maximum brake torque.

* * * * *